United States Patent [19]

Karpa

[11] Patent Number: 4,632,197
[45] Date of Patent: Dec. 30, 1986

[54] WEIGHING DEVICE

[76] Inventor: Michael J. Karpa, Box 408, Sta. B, Hamilton, Ontario, Canada, L8L 7W2

[21] Appl. No.: 746,087
[22] Filed: Jun. 18, 1985
[51] Int. Cl.$^4$ ............................................. G01G 19/04
[52] U.S. Cl. ............................ 177/163; 177/DIG. 8
[58] Field of Search ........................ 177/163, DIG. 8
[56] References Cited

U.S. PATENT DOCUMENTS 3,714,997 2/1973 Ahl et al. .......................... 177/163 X

Primary Examiner—George H. Miller, Jr.
Attorney, Agent, or Firm—Donald C. Studley

[57] ABSTRACT

The present invention provides a device for weighing rail guided vehicles. The device has at least one moveable truck support element and in the preferred embodiment has both a stationary platform and a moveable truck support assembly. The vehicle to be weighed may be placed on the device by either pulling or pushing. The vehicle to be weighed may approach the weighing device in either direction. Each end of the vehicle is weighed on separate weighing elements and the weight on each element is summed, preferably electronically to yield the overall vehicle weight. Typically one end of the vehicle is weighed on a stationary platform and one end is weighed on a moveable assembly.

8 Claims, 8 Drawing Figures

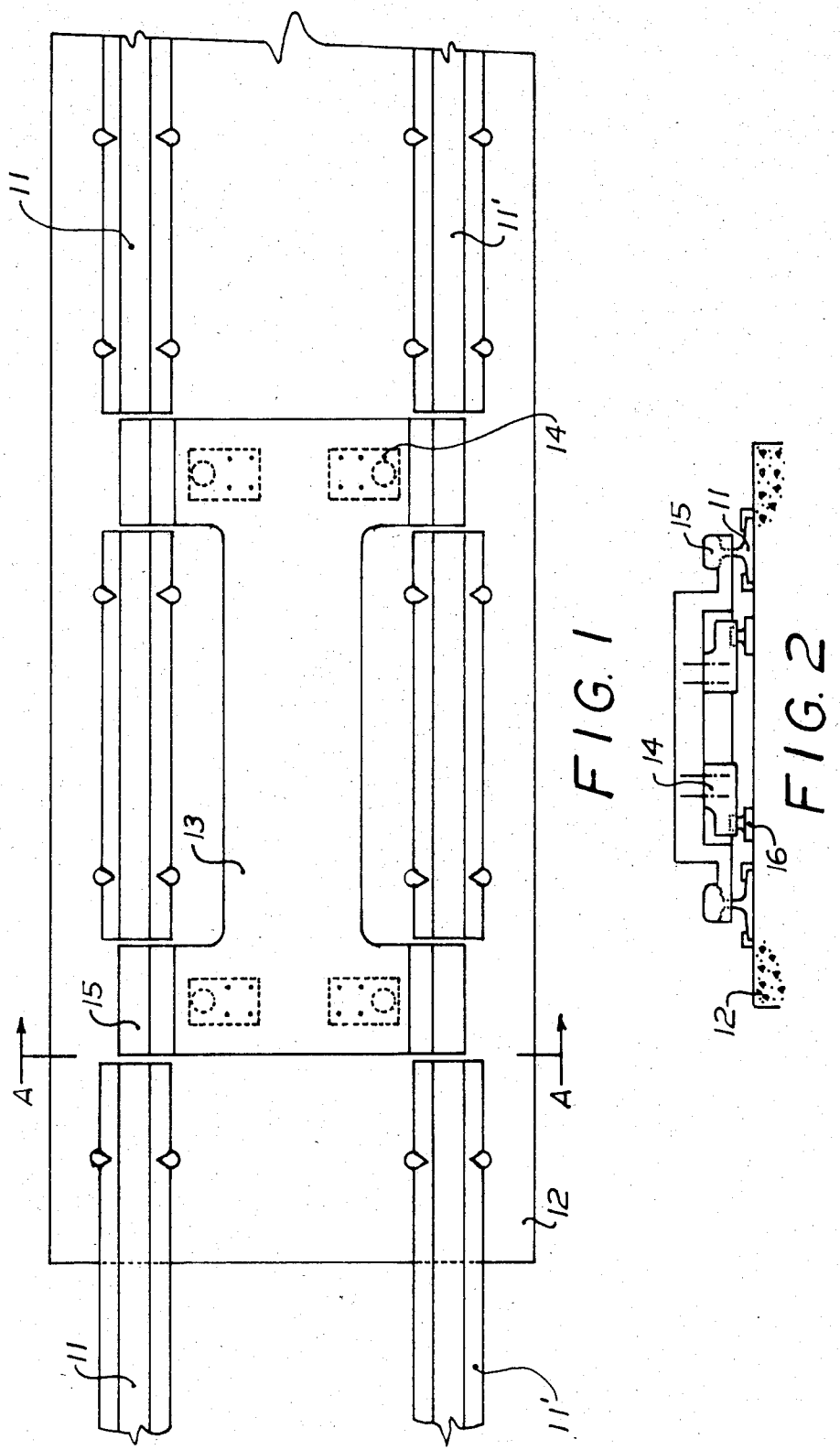

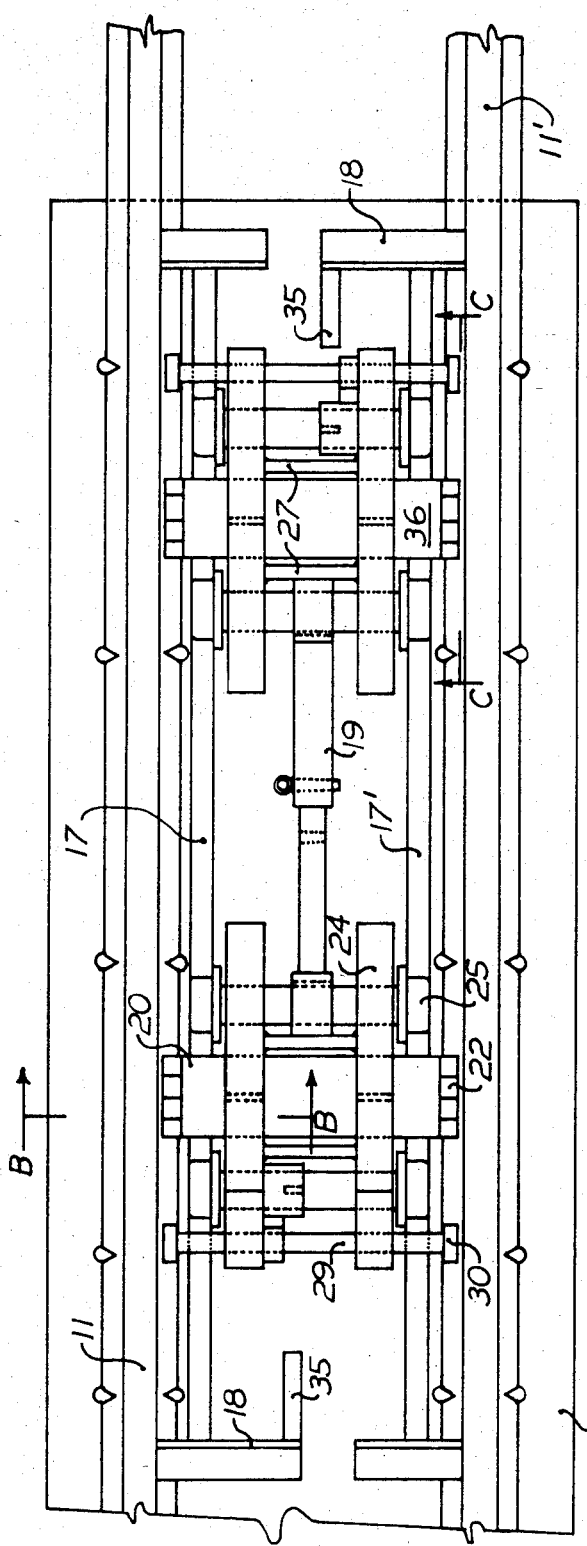
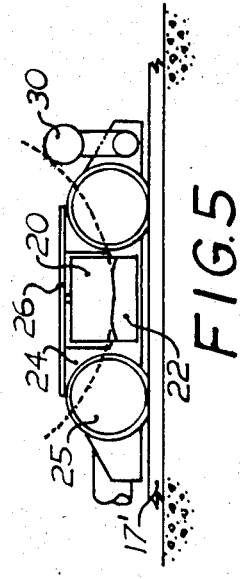
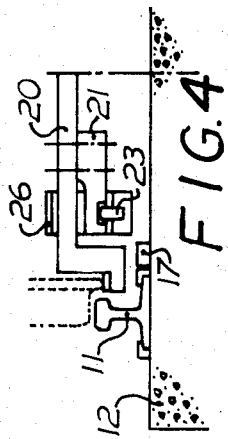

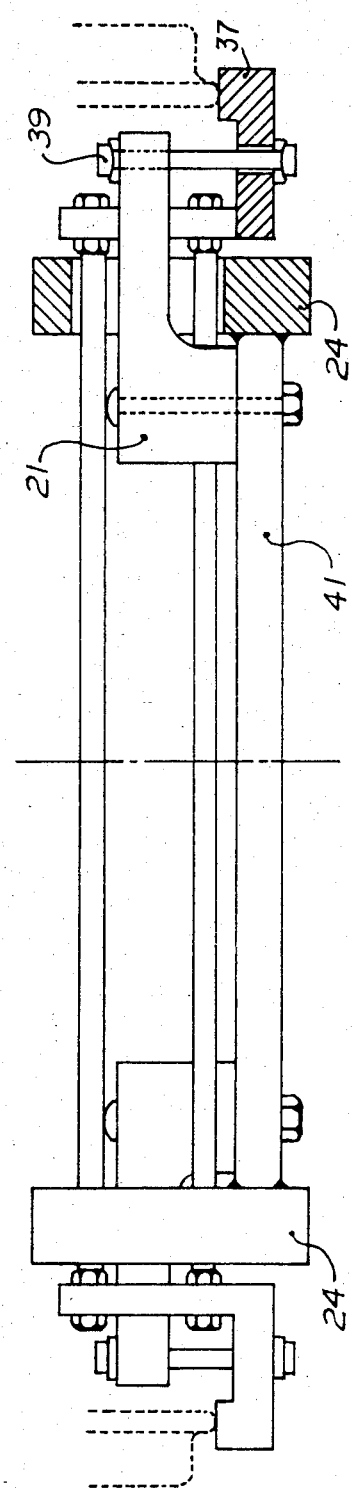

WEIGHING DEVICE

The present invention relates to weighing devices, intended to determine the weight of track guided vehicles, such as railway cars.

Typically rail guided cars are weighed by positioning the car on a stationary weighbridge structure, or platform, which, in turn, is mounted on a weight sensing means, such as a plurality of spacedly positioned load cells. Various proposals have been made in the design of such structures. Such designs range from scales having a long span sections which require a massive foundation, together with an excavation or pit beneath; to scales having a plurality of relatedly short bridging elements which require an extraordinarily large number of weight sensing means. In the case of the long span design, the foundation expense is substantial and the permanence of the foundation means that if the scale were relocated a large part of the initial investment would be left behind. In the case of the designs having a plurality of smaller spans, the cost of providing load cells for each span renders the overall scale system equally very expensive. The present invention seeks to overcome the prior art problems while providing a weighing arrangement suited to accurately weigh rail quided vehicles of various, and varying, lengths. The term "rail" as used herein is intended to cover the types of rails, or tracks, commonly used in railroad or tramway, systems, but also is meant to include systems wherein the rails or guides are of other shapes such as structural sections or composite beams.

Substantially all rail guided vehicles presently in commercial use in North America are supported at either end of the car by two axles or four pairs of wheels. Typically each end of the car is supported by an assembly having two pairs of wheels, commonly referred to as bogies, or trucks. A scale arrangement wherein two stationary weighing platforms, one for each truck, are utilized is known in the art and in commercial use. U.S. Pat. No. 3,714,997 is an example of such arrangement. Such two platform design is not entirely satisfactory in that rail vehicles greatly vary in length, and consequently any fixed location of the two platforms only permits weighing of vehicles having small variations in length. In order to have wider use, the design having two weighing platforms must either have one platform frequently relocated or what in fact is often done is to have a double platform at one or both ends. This makes the cost of the system approach that of conventional scale.

The present invention provides a single, reliable and economical weighing arrangement which adjusts to accomodate rail guided vehicles having practically any length. The present invention requires a minimal slab type foundation and is adapted to be incorporated in an existing rail system. The present device does not require a large excavation, or pit, and may be relatively easily moved from location to location as required without leaving a large part of the initial investment behind. The present device is particularly adapted to use in automatic loading (or unloading) installations where bulk materials, such as coal, ore, scrap metal cement, grain, are handled and weighed to obtain proper rail vehicle loading (good car utilization) without risk of dangerous overloads and for the determination of payload and freight billing.

BRIEF DESCRIPTION OF THE INVENTION

The present invention provides a device for weighing rail guided vehicles. The device has at least one moveable truck support element and in the preferred embodiment has both a stationary platform and a moveable truck support assembly. The vehicle to be weighed may be placed on the device by either pulling or pushing. The vehicle to be weighed may approach the weighing device in either direction, that is, initially approaching either the end closest to the stationary platform, or the end closest to the moveable assembly. The device separately weighs the two ends of the vehicle. Each end of the vehicle is weighed on separate weighing elements and the weight on each element is summed, preferably electronically to yield the overall vehicle weight. Typically one end of the vehicle is weighed on a stationary platform and one end is weighed on a moveable assembly.

The stationary platform which facilitates the weighing of one end of the vehicle is comprised of a plurality of separate rail support sections, or portions, positioned in alignment with the originating tacks of the rail system. There is one rail support section for each wheel of the vehicle to be weighed. Typically these are trucks, consisting of four separate wheels (two sets, or pairs positioned on opposite alignment) in each end of conventional rail guided vehicles. Means are provided for determining the weight of the portion of the vehicle resting on each rail support section. Typically such means are load cells or load sensing devices in the form of shear beam transducers.

A moveable assembly which facilitates weighing of the other end of the vehicle is comprised of a plurality of moveable carriages positioned to receive and carry the weight of that portion of the vehicle to be weighed. The moveable carriages are positioned to move parallel to the direction of the tracks of a conventional rail system. Each carriage is positioned to receive and carry a pair of oppositely aligned wheels from a rail guided vehicle. Typically a pair of wheels have a common axle or cross support member. Means are provided to physically transfer one pair of aligned wheels from the originating tracks to each carriage. Typically the rail vehicle has four wheels on each end and therefore each moveable assembly typically contains two moveable carriages, one for each set, or pair, of oppositely aligned vehicle wheels. Means are provided, suitably those known in the art, such as, load cells or load sensing devices, to determine the weight of the portion of the vehicle resting on the moveable carriages. Means are also provided to return each pair of wheels from each carriage to the originating track.

A totaling means, typically selected from those well known in the prior art, is used to read and add the weight on the rail support sections of the stationary platform and the weight on the moveable carriages of the moveable assembly. The result is read or translated, into the total weight of the vehicle on the device.

DETAILED DESCRIPTION OF THE INVENTION AND PREFERRED EMBODIMENT

The present invention will now be described with reference to the attached drawings in which like reference numbers refer to like components in each of the different views.

FIG. 1 is a plan view of the track weight-bridge area showing the stationary portion of the weighing device.

FIG. 2 is a sectional view taken along line A—A of FIG. 1.

FIG. 3 is a plan view of the track weigh-bridge area showing the moveable assembly portion of the weighing device.

FIG. 4 is a sectional view taken along line B—B of FIG. 3.

FIG. 5 is a sectional view taken along line C—C of FIG. 3.

FIG. 8 is a composite view of an alternative weighing arrangement which may be utilized on the moveable carriage. The right hand portion of FIG. 8 is shown in section to better illustrate this arrangement.

Figure 6:
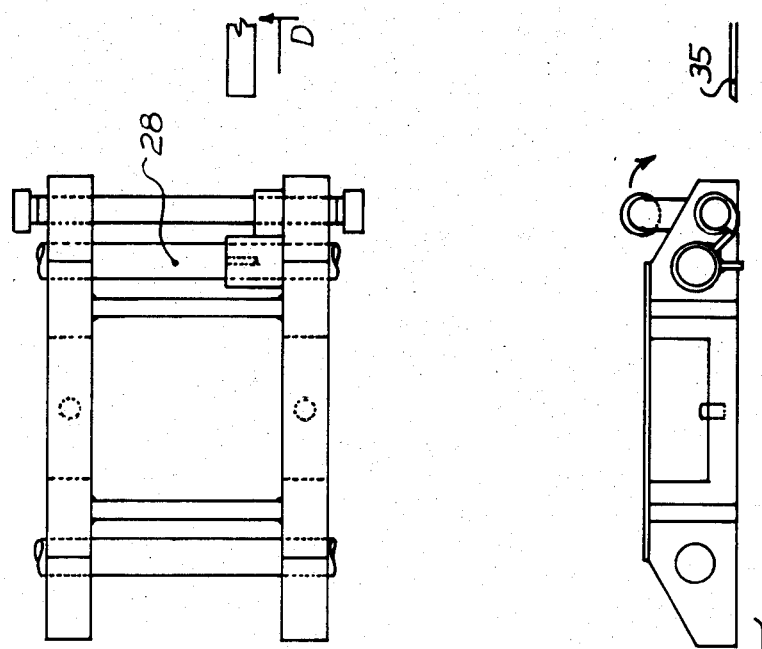
FIG. 6 is a partial plan view of the moveable carriage portion of the weighbridge device showing the carriages together with the wheel engagement and latching mechanism.

The present weighing device has at least one moveable assembly and most preferably and economical from a construction standpoint has one stationary platform and one moveable assembly. FIGS. 1 and 2 show the stationary platform portion. Looking now at FIGS. 1 and 2 in detail, spacedly positioned originating rails 11 and 11' of a conventional railway system are directed over foundation 12, preferably a reinforced concrete slab, partially shown in FIG. 1. The weighing means is positioned on, or incorporated in, foundation 12. In a preferred arrangement foundation 12 is a unitary slab which has both the stationary platform and the moveable assembly positioned thereon or therein. The stationary weighing platform consists of plurality of individual rail or track support sections, such as 15 and 15' aligned with feed tracks 11 and 11' to receive and support the wheels of one end of the rail vehicle being weighed. In operation one bogie of a vehicle to be weighed is directed to the weighing area by rails 11 and 11' and is positioned so that each pair of vehicle wheels separately rests on a pair of rail support sections, such as 15 and 15'. The weight of the vehicle on the stationary scale portion is then carred by load cells 14. Load cells 14, in turn, rest on hardened pins, typically steel, 16 mounted on foundation 12. Pins 16 have a spherically rounded contact surface and necessary clearance, as well known in the art, to compensate for thermal expansion, frame deflection, etc. In a preferred embodiment rail support sections 15 and 15' are mounted or joined on a common frame, such as, plate 13. Plate 13 has a plurality of load cells, such as 14 positioned to reflect the total weight placed thereon. Suitably load cells 14 are firmly attached, e.g., by secure bolting to plate 13.

FIGS. 3, 4, 5, 6, 7 and 8 illustrate embodiments of the automatically moveable assembly.

Looking now at FIGS. 3, 4, and 5, rails 11 and 11' of a conventional rail system are attached to foundation slab 12 and extend from the stationary platform end. The moveable assembly is normally comprised of a plurality of moveable carriages generally denoted as 36. Each carriage is positioned to receive a pair of wheels from the vehicle being weighed. The carriages consist of plate member 20, constituting a live frame, having vehicle wheel receiving portions, or stirrups, 22 at either end thereof. Stirrups 22 are internally aligned with rails 11 and 11'. Preferably stirrups 22 are "V" notched along their top surface to receive and seat a portion of the wheel flange. Plate number 20 is operably connected to two spacedly positioned load cells, such as 21.

Load cells 21 exert force on hardened metal pins 23 mounted in wheel frames 24 of carriages 36. In this manner the load cells reflect the weight on plate members 20 to the wheel frames 24 of the moveable carriages 36 which in turn is carried on wheels 25 through suitable known bearing means, e.g., lubrite, needle or roller bearings.

Positioned between originating rails 11, and 11' are a pair of secondary rails 17 and 17' which receive and carry flanged wheels 25 of carriages 36.

Secondary rails 17 and 17' preferably have a higher elevation alaong the center portion of the weighing area than at their terminals near stops 18. Usually this is easiest done by elevating rails 17 and 17' from each end gradually towards the scale center. However, the desired result may also be accomplished by maintaining rails 17 and 17' level, or substantially level, and lowering originating rails 11 and 11'. Such arrangements allow the portion of the vehicle to be weighed by the moveable carriages to be gradually lifted free from rails 11 and 11' and the weight transferred to carriages 36 resting on rails 17 and 17'. The weight of the portion of the vehicle on the moveable carriages thus rests on stirrups 22 of plates 20 and the vehicle weight on stirrups 22 is determined by the force exerted on load cells 21. As the vehicle is removed from the weighing area, the weight of the vehicle resting on the moveable assembly portion of the device is gradually transferred from carriages 36 and rails 17 and 17' back to originating rails 11 and 11'.

In this embodiment, blade springs 26 are positioned between wheel frames 24 and plates 20 to maintain the live frame plate in a fixed position. The vertical weakness of such blade springs also functions to minimize or eliminate errors of force transfer to load cells 21. Lateral beams, such as, 27 may suitably be positioned between wheel frames 24 to provide additional lateral stability of the moveable carriages. Carriages 36 may be adjustably connected by a telescopic shaft such as 19 to allow a set spaced adjustment for repeated use by vehicles having similar wheel spacing.

Figure 7:
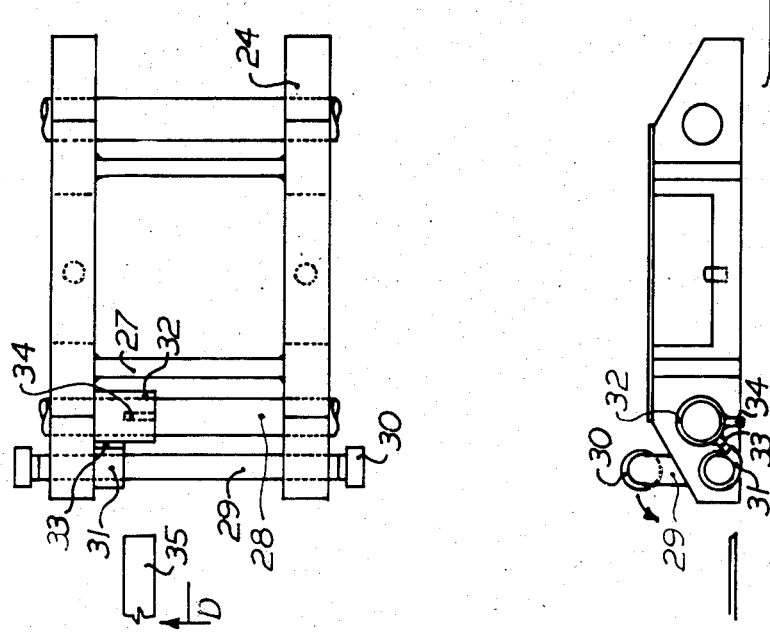
FIG. 7 is a frontal view of the carriages and mechanism shown in FIG. 6.

FIGS. 6 and 7 illustrate a method of automatically latching, or coupling, the moveable assembly to the wheels of the vehicle to be weighed.

Each outside end of carriages 36 of the moveable assembly portion have retainers 38 in the form of a roller/crank assembly to maintain the vehicle on the moveable carriages 36. Rollers 30 are positioned directly in contact with the wheel flanges of the wheels on the vehicle as it is being latched. Rollers 30 are mounted on crank shafts 29. Crank shafts 29 are spring loaded, by means not shown, to maintain position of rollers 30 in a normal vertical position (as best shown in FIG. 7). Cams 31 mounted on the longitudinal portion of crank shafts 29 allow free movement of rollers 30 in an inward direction (towards the center of the moveable platform). Each of the outer axles 28 of carriages 36 have free rotating sleeves 32 mounted thereon. Sleeves 32 may be counterweighted, or spring positioned, to normally assume the positions shown in FIG. 7. Sleeves 32 have cam tabs 33 thereon which normally contact and block the previously described uni-directional movement of cams 31. Sleeves 32 also have striker tabs 34 extending outward therefrom normally in a downward direction as shown. Striker tabs 34 are aligned with striker bars 35 suitably mounted on foundation 12 near stops 18 at the ends of rails 17 and 17'.

FIG. 8 illustrates an alternative weighing arrangement which may be utilized in the moveable carriages. In this embodiment the live weighing portion consists of stirrup 37 which is mechanically suspended from load cell 21 by spherically seated bolt 39. Side or wheel frames 24 are mounted integrally with an interconnecting member 41 which has load cells 21 secured thereto. In such embodiment the load is transmitted from the car wheels on the stirrups 37 via the hanging bolts 39 to load cells 21 and then to the side frames 24, wheels 25 in a manner similar to that previously described.

In operation the vehicle to be weighed enters the weighing area from either direction on originating rails 11 and 11'. Roller retainers 30 are normally in an upright position. Upon contact with the wheel of an entering vehicle the initially contacted rollers move inward, allowing passage of the vehicle onto the first carriage. As the vehicle progresses to the second carriage the wheel of the entering vehicle contacts the second retaining roller 30 which is prevented from outward movement by cam 31. Meantime the originally displaced retaining roller 30 on the first carriage has moved to its normal upright position and is also prevented from outward movement by its cam 31. Thus, the wheels on one end of the vehicle to be weighed are held captive to the moveable assembly portion of the scale. Now the vehicle to be weighed may be moved along the distance of support rails 17 and 17' and is positioned for weighing. The wheels on the other end of the vehicle are then spotted on the fixed platform portion of the scale. Thus, the weighing capability of the weighing device may be easily adjusted to vehicles of varying lengths, or varying distances between the wheels of the vehicle, being weighed.

After weighing, the vehicle (one end of which is carried on carriages 36) is moved in either direction. As the carriage 36, approaches the end of the device having the moveable assembly portion, striker bar 35 contacts striker tab 34 on sleeve member 32 moving the cam tab 33, releasing cam 31 and allowing crankshaft 29 to retract and move retaining roller 30 outward out of the path of the exiting vehicle wheel.

Although the invention has been described as having a single outer release mechanism positioned on the outer portion of each moveable assembly, it will be appreciated that each carriage of the moveable platform can be equipped with release mechanisms on both its inner and outer ends to capture a single pair of wheels on each carriage. In which case the telescopic shaft 19 can be dispensed with and the carriages would automatically adjust for varying bogie or truck wheelbases. Although not usually economically feasible, the present invention also contemplates the use of two moveable assemblies (eliminating the stationary platform). Such embodiment might in some cases be justified in that it would facilitate easier spotting, or placement, of the vehicle on the scales and would allow loading to take place over a longer loading area.

Although, the present invention has been described in some detail, it will be understood that the invention is susceptible of changes, modifications and variations without departing from the scope and spirit of the invention. Some examples would be the use of other types of load cells, or the use of heavy track cam followers in place of wheels 25 and their required bearings and shafts.

What is claimed is:

1. A device for weighing rail guided vehicles which comprises:
    (a) at least one moveable weighing assembly comprised of one or more moveable carriages, each carriage having wheel supporting stirrups thereon, said stirrups positioned in internal alignment with a pair of originating rails to receive the flanges of a pair of oppositely aligned wheels from a rail guided vehicle on said originating rails and transfer the weight of said vehicle from said originating rails to said stirrups,
    (b) said carriages having a means for securing or capturing said pair of oppositely aligned vehicle wheels thereon,
    (c) said carriages being moveable after said securing or capturing to adjust said moveable assembly to the distance between the wheels of the vehicle being weighed,
    (d) means for determining the weight on said stirrups of said moveable carriage, and
    (e) means for transferring the weight of said vehicle from said stirrups back to said originating rails.

2. The device of claim 1 wherein said moveable carriages move on a pair of independent secondary rails positioned within the space between said originating rails.

3. The device of claim 2 wherein said secondary rails are elevated along their middle portion a sufficient height to raise a pair of oppositely aligned vehicle wheels positioned on said carriage above and free of said originating rails.

4. The device of claim 2 wherein said secondary rails are maintained substantially level and said originating rails are lowered an amount sufficient to transfer the weight of oppositely aligned vehicle wheels positioned on said carriage from said originating rails to secondary rails.

5. A device for weighing rail guided vehicles which comprises:
    (a) a stationary weighing platform comprised of a plurality of separate rail support sections, said support sections aligned with a pair of originating rails to receive thereon the wheels from one end of a rail guided vehicle positioned on said originating rails, means to determine the weight of the portion of said vehicle resting on said support sections,
    (b) a moveable weighing assembly comprised on one or more moveable carriages, each carriage positioned to receive thereon a pair of wheels of a rail guided vehicle, means for transferring the weight of said wheels from said pair of originating rails to said carriages, means for securing or capturing said wheels on said carriages, means for determining the weight on said carriages, means for transferring the weight of said vehicle from said carriages back to said originating rails, and
    (c) means for totalling the weight on said rail support sections and on said moveable carriages.

6. The device of claim 5 wherein said moveable carriages move on a pair of independent secondary rails positioned within the space between said originating rails.

7. The device of claim 6 wherein said secondary rails are elevated along their middle portion a sufficient height to raise the vehicle wheels on said carriages above said originating rails.

8. The device of claim 6 wherein said secondary rails are maintained substantially level and said originating rails are lowered on amount sufficient to transfer the weight of oppositely aligned vehicle wheels positioned on said carriage from said originating rails to secondary rails.

* * * * *